United States Patent
Dahl et al.

(10) Patent No.: US 10,356,533 B2
(45) Date of Patent: Jul. 16, 2019

(54) SPEECH RECOGNITION

(71) Applicant: SINTEF TTO AS, Trondheim (NO)

(72) Inventors: Tobias Dahl, Trondheim (NO);
Matthieu Lacolle, Trondheim (NO)

(73) Assignee: Sintef TTO AS, Trondheim (NO)

( * ) Notice: Subject to any disclaimer, the term of this patent is extended or adjusted under 35 U.S.C. 154(b) by 0 days.

(21) Appl. No.: 15/565,350

(22) PCT Filed: Apr. 11, 2016

(86) PCT No.: PCT/GB2016/051010
§ 371 (c)(1),
(2) Date: Oct. 9, 2017

(87) PCT Pub. No.: WO2016/162701
PCT Pub. Date: Oct. 13, 2016

(65) Prior Publication Data
US 2018/0075867 A1    Mar. 15, 2018

(30) Foreign Application Priority Data

Apr. 9, 2015 (GB) .................................. 1506046

(51) Int. Cl.
*H04R 23/00* (2006.01)
*G01S 3/80* (2006.01)
(Continued)

(52) U.S. Cl.
CPC ............ *H04R 23/008* (2013.01); *G01S 3/80* (2013.01); *G01S 3/805* (2013.01); *G10L 15/22* (2013.01);
(Continued)

(58) Field of Classification Search
CPC ...... H04R 1/342; H04R 3/005; H04R 23/008; H04R 2201/003; G10S 3/80; G10S 3/805;
(Continued)

(56) References Cited

U.S. PATENT DOCUMENTS

| 5,448,358 A | 9/1995 | Ishizuka et al. |
| 5,920,418 A | 7/1999 | Shiono et al. |

(Continued)

FOREIGN PATENT DOCUMENTS

| CN | 1088312 A | 6/1994 |
| CN | 1121590 A | 5/1996 |

(Continued)

OTHER PUBLICATIONS

International Search Report and Written Opinion issued in International Patent Application No. PCT/GB2016/051010, 12 pages (dated Jun. 3, 2016).

(Continued)

*Primary Examiner* — Joshua Kaufman

(74) *Attorney, Agent, or Firm* — Rothwell, Figg, Ernst & Manbeck P.C.

(57) ABSTRACT

An optical microphone arrangement comprises: an array of optical microphones (4) on a substrate (8), each of said optical microphones FIG. 2 (4) providing a signal indicative of displacement of a respective membrane (24) as a result of an incoming audible sound; at first processor (12) arranged to receive said signals from said optical microphones (4) and to perform a first processing step on said signals to produce a first output; and a second processor (14) arranged to receive at least one of said signals or said first output; wherein at least said second processor (14) determines presence of at least one element of human speech from said audible sound.

19 Claims, 8 Drawing Sheets

(51) Int. Cl.
*G10L 15/28* (2013.01)
*H04R 3/00* (2006.01)
*G10L 25/78* (2013.01)
*H04R 1/40* (2006.01)
*G01S 3/805* (2006.01)
*G10L 15/22* (2006.01)
*G10L 25/84* (2013.01)
*G10L 15/08* (2006.01)
*G10L 21/0216* (2013.01)

(52) U.S. Cl.
CPC .............. *G10L 15/28* (2013.01); *G10L 25/78* (2013.01); *G10L 25/84* (2013.01); *H04R 1/406* (2013.01); *H04R 3/005* (2013.01); *G10L 2015/088* (2013.01); *G10L 2015/223* (2013.01); *G10L 2021/02166* (2013.01); *H04R 2201/003* (2013.01)

(58) Field of Classification Search
CPC ..... G10L 25/7884; G10L 15/22; G10L 15/28; G10L 2015/088; G10L 2015/223; G10L 2021/02166
See application file for complete search history.

(56) References Cited

U.S. PATENT DOCUMENTS

| | | | |
|---|---|---|---|
| 5,969,838 A * | 10/1999 | Paritsky | H04R 1/406 250/227.14 |
| 6,567,572 B2 | 5/2003 | Degertekin et al. | |
| 6,987,615 B2 | 1/2006 | Shiono et al. | |
| 7,116,430 B2 | 10/2006 | Degertekin et al. | |
| 7,139,235 B2 | 11/2006 | Nakanishi et al. | |
| 7,164,479 B2 | 1/2007 | Johansen et al. | |
| 7,184,368 B2 | 2/2007 | Johansen et al. | |
| 7,355,720 B1 | 4/2008 | Carr | |
| 7,460,448 B2 | 12/2008 | Kadowaki et al. | |
| 7,518,737 B2 | 4/2009 | Hall et al. | |
| 8,205,497 B1 * | 6/2012 | Okandan | G01C 19/5712 73/514.26 |
| 2002/0180978 A1 | 12/2002 | Berg et al. | |
| 2005/0018541 A1 | 1/2005 | Johansen et al. | |
| 2007/0165896 A1 | 7/2007 | Miles et al. | |
| 2009/0268211 A1 | 10/2009 | Carr et al. | |
| 2010/0145620 A1 | 6/2010 | Georgi et al. | |
| 2012/0136655 A1 * | 5/2012 | Yamabe | G10L 25/90 704/207 |
| 2013/0246062 A1 | 9/2013 | Avargel et al. | |
| 2015/0006176 A1 * | 1/2015 | Pogue | G10L 15/22 704/249 |
| 2015/0323456 A1 * | 11/2015 | Agashe | H04R 1/04 356/445 |

FOREIGN PATENT DOCUMENTS

| | | |
|---|---|---|
| CN | 1388960 A | 1/2003 |
| CN | 1417597 A | 5/2003 |
| CN | 1485828 A | 3/2004 |
| CN | 105182000 A | 12/2015 |
| EP | 0691542 A1 | 1/1996 |
| EP | 1189482 A1 | 3/2002 |
| RU | 2365064 C1 | 8/2009 |
| RU | 2473181 C1 | 1/2013 |
| WO | WO 03/043377 A1 | 5/2003 |
| WO | WO 03/046498 A1 | 6/2003 |
| WO | WO 2014/058472 A1 | 4/2014 |
| WO | WO 2014/202753 A1 | 12/2014 |
| WO | WO 2015/128431 A1 | 9/2015 |

OTHER PUBLICATIONS

Brown et al., "A Symmetric 3×3 Coupler Based Demodulator for Fiber Optic Interferometric Sensors," SPIE vol. 1584, Fiber Optic and Laser Sensors IX, pp. 328-335 (1991).

Kim et al, "Towards a sub 15-dBA optical micromachined microphone", J. Acoust. Soc. Am. 135 (5), May 2014.

Hall et al., "Micromachined Optical Microphone Structures with Low Thermal-Mechanical Noise Levels," J. Acoust. Soc. Am. 122(4), Acoustical Society of America, pp. 2031-2037 (Oct. 2007).

Hall et al., "Micromachined Accelerometers With Optical Interferometric Read-Out and Integrated Electrostatic Actuation," Journal of Microelectromechanical Systems, vol. 17(1), pp. 37-44 (Feb. 2008).

Kuntzman et al., "Performance and Modeling of a Fully Packaged Micromachined Optical Microphone," Journal of Microelectromechanical Systems, vol. 20(4), pp. 828-833 (Aug. 2011).

* cited by examiner

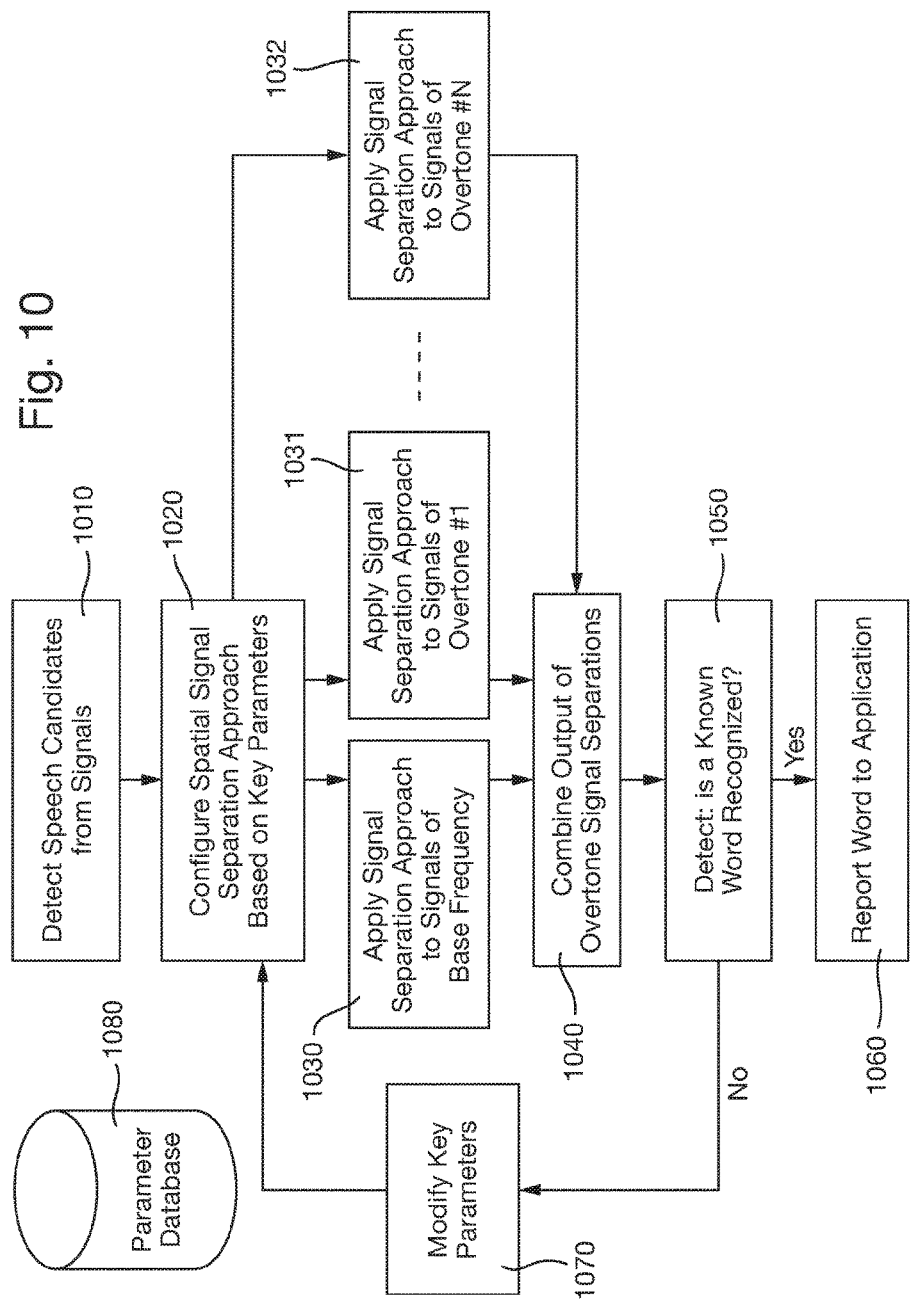

SPEECH RECOGNITION

CROSS-REFERENCE TO RELATED APPLICATION

This application is a 35 U.S.C. 371 National Phase Entry Application from PCT/GB2016/051010, filed Apr. 11, 2016, which claims the benefit under 35 U.S.C. § 119(a) of the filing date of United Kingdom patent application No. 1506046.0, filed Apr. 9, 2015, the respective disclosure(s) which is(are) incorporated herein by reference.

BACKGROUND

This invention relates to certain arrangements for speech recognition.

The ability for machines to understand natural human speech has long been a goal. Great strides have been made in recent years, although it remains a difficult and computationally-intensive task. In particular, although there has been an increase in the use of speech recognition assistants on mobile devices, these typically require processing to be carried out remotely; it is currently not possible to carry out any but the most basic forms of speech recognitions using the processing power available locally on most mobile devices.

One of the factors increasing the complexity of the speech recognition problem is that of background noise. The microphones used in typical mobile devices are relatively omni-directional and will thus be sensitive to sounds from all directions (albeit not uniformly). They tend therefore to pick up background sounds (which will often include speech from others) as well as the speech which it is desired to understand.

Although better performance can be achieved using multiple microphones, this gives rise to practical problems with accommodating the additional hardware in a device. However conventional small condenser microphones are limited by the amount of inherent of 'self' noise which they are subject to. Condenser microphones are based on a measurement of a change in capacitance. Physical constraints (such as the maximal displacement of the membrane under high acoustic pressures) make it necessary to have a certain distance between the two plates of the capacitance (one of the plate is the microphone membrane, the other is a reference electrode situated under the membrane). This implies that the capacitance is very low, in other words the output impedance is high. In order not to short circuit this capacitance, the input impedance of the associated preamplifier must be equivalently high. High impedance will give high self-noise. A larger membrane will give a higher signal level and a higher capacitance, and thus a better signal to noise ratio (SNR) but level, while smaller area will give a lower SNR.

The present invention in its several aspects intends to provide arrangements which are beneficial in at least some circumstances in tackling the challenges facing artificial speech recognition.

SUMMARY

When viewed from a first aspect the invention provides an optical microphone arrangement comprising:

an array of optical microphones on a substrate, each of said optical microphones providing a signal indicative of displacement of a respective membrane as a result of an incoming audible sound;

at first processor arranged to receive said signals from said optical microphones and to perform a first processing step on said signals to produce a first output; and a second processor arranged to receive at least one of said signals or said first output;

wherein at least said second processor determines presence of at least one element of human speech from said audible sound.

Thus it will be seen by those skilled in the art that in accordance with the invention a number of features are used together to provide what has been found, in preferred embodiments at least, to provide an advantageous arrangement for speech recognition. First it will be appreciated that an array of optical microphones is proposed. Although optical microphones are known per se, the present Applicant has appreciated that benefits can be realised when they are used in an array for speech recognition purposes and when two separate processors are used for processing the signals received therefrom.

More particularly the Applicant has appreciated that optical microphones have a low inherent or 'self' noise and moreover that they can be fabricated so as to have a small area. Crucially there is no strong negative correlation between size and inherent noise. By contrast in other types of microphones—such as conventional MEMS condenser microphones—the sensitivity of the microphone is dependent on the size of the membrane. This means that as conventional MEMs microphones get smaller, there is a reduction in the signal to noise ratio.

The Applicant's insight is that the low self-noise characteristics and small size of optical microphones can be exploited in speech processing applications by providing the optical microphones in a closely spaced array. In particular it has been appreciated that where the self-noise floor is sufficiently low (as can be achieved with optical microphones), additional information can be extracted from the incoming signals received by an 'oversampled' array of microphones. This phrase is used to denote an array where the spacing between elements is less than half a wavelength of the signals of interest, Conventional sampling theory would indicate that a spacing lower than this half-wavelength threshold is not necessary as it would give no additional benefit. However as will be demonstrated hereinbelow, the Applicant has found that a benefit can indeed be achieved in that the array can be used to 'listen' in multiple different directions to create candidates on which speech recognition algorithms can be carried out to establish which gives the most favourable result. Additionally or alternatively separate candidate calculations can be carried out based on different assumptions as to environmental conditions such as pressure, temperature and humidity which affect the speed of sound.

Having the array closely spaced provides further advantages in terms of overall physical size. This means for example that the advanced performance which can be achieved from an array can be implemented in a wide range of devices, making it possible to implement the array in devices having a small form factor such as smart phones or smart watches, or more discreetly in larger devices such as laptops without numerous intrusive apertures spaced around the device as has been employed for example in the latest generation of MacBook (Registered Trade Mark) computers.

The multiple processor approach set out allows a significant portion of this computationally-intensive task to be carried out by a separate processor which may not be required all the time. It may, for example be remote from the actual microphone array—e.g. on a remote server. Alternatively it may be a more powerful central processing unit (CPU) as part of the device itself. Speech recognition processing is particularly amenable to this approach as it does not require instantaneous real-time results which allows processing of the candidates to be carried out at least partly serially.

As mentioned above, in preferred embodiments the array of optical microphones is closely spaced. This could be expressed as an absolute dimension. In a set of embodiments therefore the optical microphones are arranged at a mutual spacing of less than 5 mm. This is novel and inventive in its own right and thus when viewed from a second aspect the invention provides an optical microphone arrangement comprising:

an array of optical microphones on a substrate having a mutual closest spacing less than 5 mm, each of said optical microphones providing a signal indicative of displacement of a respective membrane as a result of an incoming audible sound;

one or more processors arranged to receive said signals from said optical microphones and to determine presence of at least one element of human speech from said audible sound.

The spacing may be less than 5 mm, e.g. less than 2 mm, e.g. less than 1 mm, e.g. less than 0.5 mm. As explained previously it is the low noise characteristics of optical microphones which permit an array comprising a given number of elements to be provided on a smaller physical area than with conventional microphones and so therefore open up the possibility of the above-mentioned over-sampling.

The significance of the spacing of an array is also linked to the wavelength of the signals which it is being used to receive and thus the invention extends to a method of determining presence of at least one element of speech from an incoming audible sound, said audible sound having at least a portion thereof within a wavelength band, the method comprising receiving said audible sound using an array of optical microphones in accordance with either of the first or second aspects of the invention, said microphones having a mutual spacing less than half the longest wavelength of said wavelength band; and processing the signals from the microphones to detect said element of speech.

This is also novel and inventive in its own right and so when viewed from a third aspect the invention provides a method of determining presence of at least one element of speech from an incoming audible sound, said audible sound having at least a portion thereof within a wavelength band, the method comprising receiving said audible sound using an array of optical microphones on a substrate, said microphones having a mutual spacing less than half the longest wavelength of said wavelength band, each of said optical microphones providing a signal indicative of displacement of a respective membrane as a result of said audible sound; and processing the signals from the microphones to detect said element of speech.

The microphones may have a mutual spacing less than half the median wavelength of said wavelength band, e.g. less than half the shortest wavelength of said wavelength band.

In a set of embodiments the methods set out above comprise processing the signals from the microphones so as to use preferentially a portion of said audible sound received from a given direction or range of directions. This allows for the spatial separation of sound in order to give the opportunity to isolate a speaker. This may be achieved in accordance with a set of embodiments of the invention by using sound from a plurality of directions and selecting one of said directions based on which gives the best result. Thus in a set of embodiments the first and/or second processors are arranged to perform a plurality of processing operations on said signals wherein said processing operations correspond to a plurality of assumptions that the signals emanate from a respective plurality of directions to give a plurality of candidate determinations; and thereafter to select one of said candidate assumptions based on a selection criterion.

The separation of processing discussed above could be implemented in any of a number of different ways. In a set of embodiments the first processor is arranged to determine presence of at least one element of human speech from said audible sound and, if said element is determined to be present, to issue a wake-up signal to cause said second processor to change from a relatively passive mode to a more active mode. By using the first processor to wake up the second processor only when a user is speaking, a high degree of power efficiency can be achieved. The first processor may be lower power processor since it may only be required to recognise one or a few basic elements of speech. This could be a specific 'wake up' word or sound or even a more basic criterion such as a particular frequency or a particular energy in a band of frequencies. The first processor may therefore operate more frequently, or continuously, without excessively impacting on battery life which is of course of critical importance in mobile devices. The second processor may be more power hungry as it will perform the most significant speech recognition processing but will only be required to be powered when a user is actually speaking and wanting to interact with the device.

In the embodiments described above where the first processor is arranged to wake up the second processor, it will be appreciated that the improved sensitivity of the specified optical microphones, both in terms of improved SNR and the ability to operate in a closely-spaced array, gives rise to a further advantage in that the 'low power' algorithms operated by the first processor have a higher likelihood of successfully identifying the criterion necessary to issue the wake-up signal. This reduces overall average power consumption since it reduces the occurrences of the second processor being woken up erroneously.

In a set of embodiments the first processor is provided in the same device as the optical microphone array, e.g. on a printed circuit board onto which the microphone array is mounted or even on the same substrate e.g. on the same printed circuit board (PCB) as some of the microphone elements, or on an integrated substrate with the microphone such as an application specific integrated circuit (ASIC). This reduces production costs. In a set of embodiments the second processor is provided remotely of the device in which the optical microphone array is provided—e.g. with a local or wide area network connection therebetween.

Additionally or alternatively the first processor could be used to carry out initial signal processing to assist with speech recognition in the second processor. This could for example be the arrangement used after the first processor has woken up the second. The first processor could for example carrying out filtering, noise reduction etc. In a set of embodiments said first processor is arranged to carry out beamforming on said signals and said second processor is arranged to carry out speech recognition.

It will be appreciated therefore that the second processor may advantageously perform processing on signals output from the first processor. However this s not essential: the first and second processors could work on the signals in parallel. For example the first processor could work on a first portion of the frequency spectrum and the second could work on a second portion of the frequency spectrum.

Typically speech recognition involves analysing received sound for characteristic frequencies or frequency patterns which correspond to know speech elements such as syllables or letter sounds. However the Applicant has recognised that information which may be useful for identifying elements of speech may be present in multiples of the characteristic frequency or frequencies.

As they are generated by the same spoken sound, these frequency multiples (referred to hereinafter as "overtones") provide extra information that can improve the recognition of a speech element, particularly in the situation where the base frequency is subject to environmental noise, as the overtones are unlikely to be affected to the same extent by the same noise source. Indeed the Applicant has recognised that in general noise from environmental sources is likely to be generally less prevalent at higher frequencies because of the greater attenuation coefficient for higher frequencies for sound in air.

The Applicant has recognised that a further benefit of using "overtones" for speech recognition, which may be available in at least some embodiments, is related to the small physical size of the arrays discussed hereinabove; namely that such small arrays will typically be able to provide better spatial resolution for higher frequencies than for lower ones.

Accordingly in a set of embodiments of any of the foregoing aspects of the invention the (second) processor is arranged to determine presence of at least one element of human speech from said audible sound using at least a base frequency $f_B$ and an overtone frequency $f_O = n \cdot f_B$ where n is an integer.

Such an approach is considered to be novel and inventive in its own right and thus when viewed from a further aspect the invention provides an optical microphone arrangement comprising:

an array of optical microphones on a substrate, each of said optical microphones providing a signal indicative of displacement of a respective membrane as a result of an incoming audible sound;

one or more processors arranged to receive said signals from said optical microphones and to determine presence of at least one element of human speech from said audible sound using at least a base frequency and an overtone frequency which is an integer multiple of the base frequency.

In either case only a single overtone could be used or a plurality could be used. Although the overtones will typically have a lower energy than the corresponding base frequency, by using multiple overtones a significant energy, e.g. comparable to or even greater than the energy at the base frequency, may be available.

It will be appreciated by those skilled in the art, that whilst the foregoing discussion makes reference to specific discrete frequencies, in practice the principle can be applied to bands of frequencies—e.g. where the base frequency is the centre or peak energy frequency—or to multiple base frequencies for a given speech element.

In all aspects of the invention utilising overtones, conveniently the array is small—e.g. to over-sample the sound signal at least at the base frequency. As before, in a set of embodiments the optical microphones have a mutual closest spacing less than 5 mm, e.g. less than 2 mm, e.g. less than 1 mm, e.g. less than 0.5 mm. As explained previously it is the low noise characteristics of optical microphones which permit an array comprising a given number of elements to be provided on a smaller physical area than with conventional microphones and so therefore open up the possibility of the above-mentioned over-sampling.

In a related set of embodiments the optical microphones have a mutual spacing less than half the wavelength of said base frequency.

In a set of embodiments of all aspects of the invention utilising overtones beamforming is carried out at the frequency of the overtone(s). For example the device could be arranged to determine a base frequency from a received audio signal and then to focus (using beamforming) on an overtone of the determined frequency. Where first and second processors are provided in accordance with the first aspect of the invention the aforementioned beamforming may be carried out by the first processor.

In a set of embodiments the optical microphones comprise: a membrane; a light source arranged to direct light at said membrane such that at least a proportion of said light is reflected from the membrane; and an optical detector arranged to detect said reflected light. Typically each microphone in the array comprises its own individual membrane but this is not essential. Similarly each microphone has its own light source and detector but one or other of these could be shared between individual microphone elements.

Movement of the membrane could be determined simply through a change in the intensity or angle of light reflected therefrom but in a preferred set of embodiments a diffractive element is provided between said light source and said membrane. This allows movement of the membrane to be detected by measuring the diffraction efficiency of the diffractive element. The diffraction efficiency is a measure of the proportion of incident light which is reflected (zero order diffraction) and that which is diffracted into another diffraction order and it is a function of the distance between the diffractive element and the membrane. In other words as the distance between the diffractive element and the reflecting surface of the membrane changes through movement of the membrane induced by incident sound pressure, and the fraction of light directed into different diffraction orders of the diffractive element is changed and this can be detected as a change of intensity detected by the detector which is located at a given position. This provides for much more accurate detection of membrane movements and therefore of sound. In a set of embodiments the diffractive element comprises a diffractive pattern formed by a reflective material. In a set of embodiments a plurality of detectors is provided for each microphone. These can further enhance the signal to noise ratio achievable. Further, in a set of embodiments a plurality of diffractive elements is employed to increase the dynamic range achievable.

BRIEF DESCRIPTION OF THE DRAWINGS

Certain embodiments of the invention will now be described, by way of example only with reference to the accompanying drawings in which:

FIG. 10 is a flowchart describing operation of a further embodiment of the invention which employs overtone detection.

DETAILED DESCRIPTION OF THE INVENTION

Figure 1:
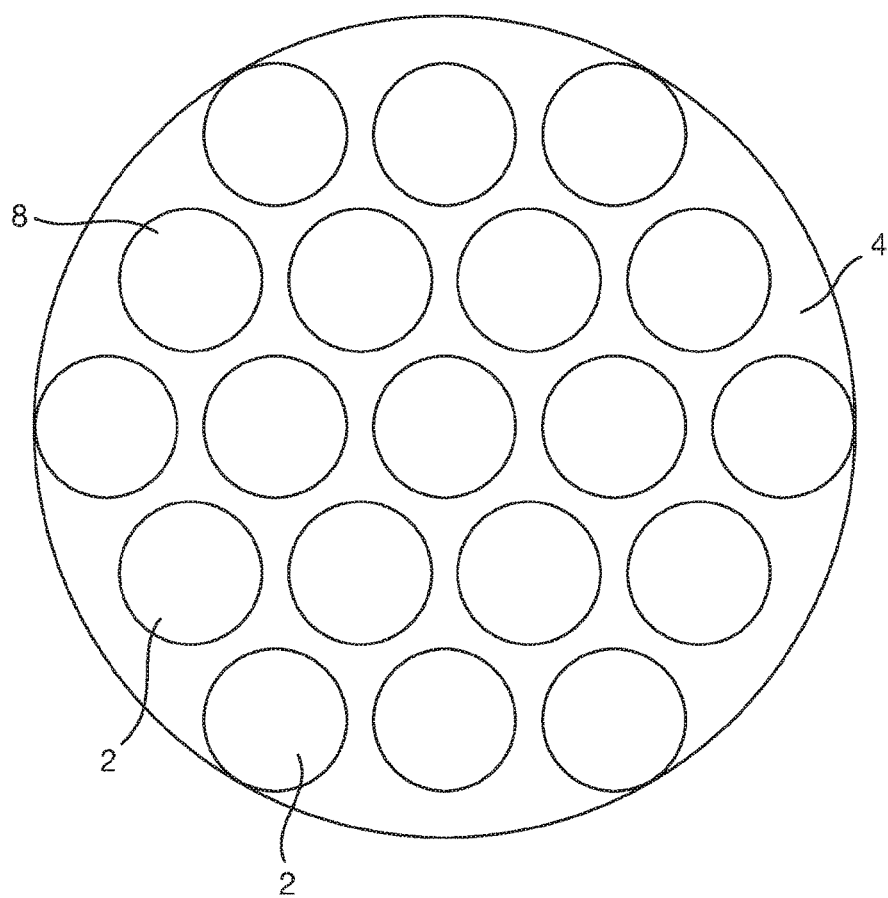
FIG. 1 shows an array of optical microphones in accordance with the invention.

FIG. 1 shows an array of optical microphones 2. The microphones 2 are provided on a common substrate 4 which could, for example, be a printed circuit board (PCB). The microphones may, purely by way of example, have a centre-to-centre spacing of approximately 2 mm. The array could, for example have an extent of 2 cm across or 2 cm by 2 cm in the case of a square array. The array might therefore comprise of the order of a hundred individual microphone elements.

Figure 2:
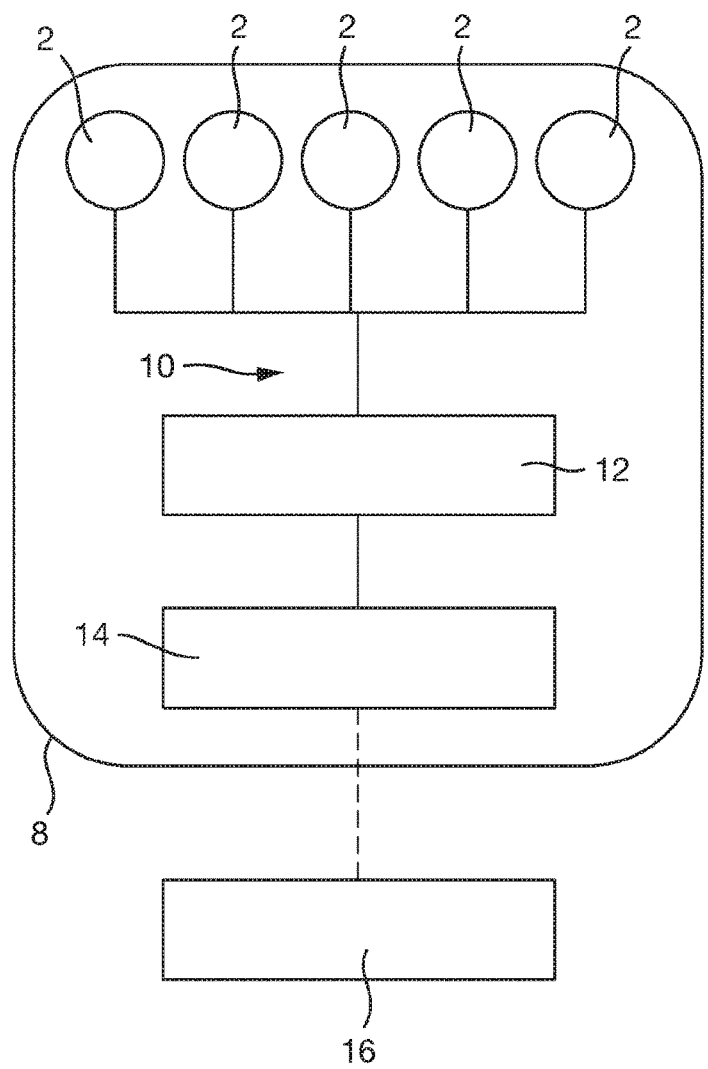
FIG. 2 is a block system diagram of a speech recognition system embodying the invention.

FIG. 2 is a block system diagram for a mobile electronic device 8—such as a smartphone, smart watch or tablet computer—which includes the array of optical microphones 2. The signal outputs from the microphones 2 are connected to a data bus 10. The microphones 2 could feed raw data signals to the bus or some elementary processing could be carried out at each microphone 2, e.g. filtering or amplification. The bus 10 connects the microphones to a digital signal processor (DSP) 12. This could be a standard DSP or custom designed. The output from the DSP 12 is fed to an applications processor 14, also provided on the device 8. The applications processor 14 communicates with a remotely located processor 16 by means of a suitable data network. This could involve any known wireless data network such as WiFi, Zigbee, Bluetooth™ etc.

In use the microphones 2 are active when the device 8 is in an active state (i.e. not in standby) and they pass signals to the DSP 12 via the bus 10. The DSP 12 carries out processing on the received signals as will now be described. First, assuming that the array comprises P individual microphone elements, the signals y(t) received by the microphones, denoted here as $y_1(t)$, $y_2(t)$, ... $y_P(t)$ are recorded. Next, the frequency spectrum of one or more of those signals is estimated from a time-sample. A crude yet fast and effective way of doing this for the r'th signal from the array is to compute $$\hat{P}_r(\varpi) = \frac{1}{N}\left|\sum_{k=0}^{N-1} y_r(t-k)e^{-ik\varpi}\right|^2$$

For a set of frequencies $\{\varpi\}$ of interest. This power spectrum estimate can be computed efficiently via a Fast Fourier Transform, noting that the term inside the brackets |.| is simply a Discrete Fourier Transform (DFT) of the incoming signal $y_r(t)$.

Third, based on the power spectrum estimates $\hat{P}_r(\varpi)$. one of them or a plurality of them could be computed—and a decision can be made whether to do something else. Such a decision could involve starting a further process in the first processor 12 to carry out better signal extraction, using for example beam forming or other separation techniques. Alternatively the decision could be to wake up the second processor 16.

In a first simplistic example, the processor 12 uses a crude detection mechanism to detect a key word, say "hello". This mechanism could be such that it considers the power spectrum of an uttered sentence, to see if it has a match with the power spectrum of the world "hello". Such a matching operation can be done with very low power requirements, via, for instance, a hardware-enabled Discrete Fourier Transform (DFT) to derive an estimate of power spectrum as explained above, and also in more detail in e.g. "Statistical Digital Signal Processing and modelling" by M. H. Hayes. If there is a match—as could be detected using any kind of classifier such a linear or discriminant analysis—the second processor 14 could be woken up to listen in on both a buffered signal (such as the "hello" candidate) as well as follow-up utterances, such as "open file" or "turn off computer".

The first detection step may, as a consequence of the simpler implementation, be rather crude. For instance, the word "hotel" could have a similar DFT power spectrum to "hello", and lead to a wake-up of the second processor 14 as well. However, at this stage, the more advanced processing power of the second processor 14 means that it can disambiguate the word "hotel" from the word "hello", and hence make a decision not to follow up with more processing and instead return to its sleep state.

The optical microphones 2 are advantageous over more conventional MEMS microphones. The lower self-noise means that the power spectrum estimates will be more accurate and able to pick up "trigger words" at longer distances than with conventional MEMS microphones. Moreover two or more optical microphones from the array can be used to accurately detect the direction of arrival of the sound using any know direction of arrival (DOA) technique, such as simplistic beam forming, time-delayed signal subtraction or the MUSIC algorithm (see i.e. "Spectral Analysis of Signals", by P. Stoica & Randolph Moses. For example this could be used to estimate whether the sound is likely to have come from a someone speaking in front of the device or from a source that is, say, to the side of the device. The low noise characteristics of the optical MEMS microphones means that such useful detection angles can be computed even with a very small baseline array, making it particularly useful for small form factor devices such as smart watches, bracelets or glasses.

In a second and more advanced example, the first processor 12 is used to detect a key word such as "hello", but this may happen after beam forming has been used. The processor 12 may react to certain characteristics of the incoming signals. This could be a distribution of signals looking like speech, such as a sub- or super-Gaussian distribution, as explained in i.e. "Independent Component Analysis for Mixed sub-gaussian and super-Gaussian Sources", by Tee-Won Lee and Terrence J. Sejnowski. Then, the processor 12 decides to turn on beam forming to try to locate the source. It can work on both stored signals as well as new incoming signals. If the output of a beam former produced a word that could be recognized as a potential triggering word, the second processor 14 is woken up. Again, this second processor can, using its greater processor power, matching methods and word dictionary size, detect that the word "hello" was not actually spoken (but perhaps instead "halo"), and go back to its sleep state.

In this second example, the usefulness of the array optical microphones 2 is twofold. First, the original signal distribution is recovered by the microphones is more accurate than with conventional microphones due to the previously-mentioned low-noise characteristics. Second, the use of the combination of microphone elements 2, by high-resolution array beam forming, enables detection of lower level sounds (such as whispers or far away sound), as well as a better (i.e. less noise-prone) candidates for word detection both at the first 12 and the second 14 processor. Without the optical microphone array, the array would have had to be built much bigger to exhibit the same level of "sensitivity"—i.e. by using a bigger base line.

In both of the above cases, the second processor 14 can use more powerful means of signal extraction than the first one. For instance, the first processor 12 may use a crude beam-forming approach, such as delay-and-sum (DAS) beam forming. It could also use more sophisticated approaches such as adaptive (Capon) beam forming. However generally, the second processor 14 will use more powerful means of spatial signal extraction than the first 12.

For instance, if the first processor 12 used DAS beam forming, then the second processor 14 might use adaptive beam forming to increase the effective resolution/performance over the first. Or, the second processor 12 may use a time-domain de-convolution approach for source separation, which generally requires inversion of a Block-Toeplitz matrix structure, as explained in i.e. "Blind Speech Separation in Time-Domain Using Block-Toeplitz Structure of Reconstructed Signal Matrices", by Zbyněk Koldovský, Jiří Málek and Petr Tichavský. This is typically much more CPU-intensive than using frequency domain based methods, but can also yield much higher accuracy and resolution in its signal recovery efforts. The second processor 14 may also use more advanced word recognition methods than the first processor. For instance, while the first processor 12 may use the matching of a power spectrum as a first approximation, the second processor may use techniques such as Hidden Markov Models (HMM), Artificial Neural Networks (ANN) or approaches incorporating language models (LMs) to boost its performance. It may also have a bigger and/or more cleverly searchable set of words which it can use for recognition due to its increased memory.

The processing necessary to carry out speech recognition may be conducted entirely on the device 8. However advanced processing could be carried out by the remote processor 16 instead of or in addition to the local second processor 14.

Figure 3:
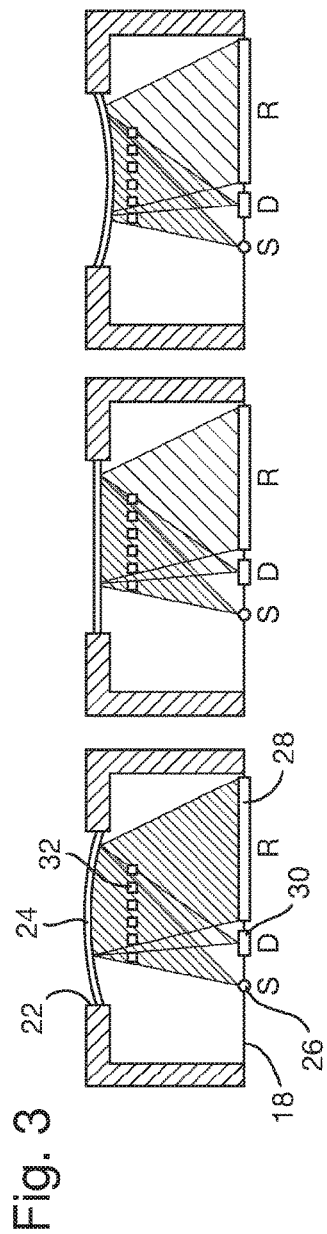
FIG. 3 is a series of schematic illustrations of the basic operating principle of the optical microphones in the array of FIG. 1.

FIG. 3 shows schematically the main functional parts of an exemplary optical microphone manufactured using standard micro-electromechanical systems (MEMS) technology. It comprises a substrate 18 on which is mounted an upstanding housing 20. The housing has an aperture 22 in its upper face across which spans a flexible silicon nitride membrane 24. Inside the housing, mounted on the substrate 18, are a light source in the form of a laser, e.g. a vertical cavity surface-emitting laser (VCSEL) 26, and two photo-detectors 28, 30. Between the laser diode 26 and the membrane 24 is a diffractive element 32. This could, for example, be implemented by reflective metal strips deposited in a diffractive pattern on top of a transparent plate such as a bonded glass chip (see FIG. 7) or provided by elements suspended at appropriate positions inside the housing 20.

The left hand diagram of FIG. 3 illustrates the membrane having been flexed upwardly, the centre diagram illustrates it being in a neutral position and the right hand diagram illustrates it being flexed downwardly. These represent different instantaneous positions of the membrane 24 as it is driven by an incoming sound wave. As will be appreciated from FIG. 3, the position of the membrane 24 determines the distance between it and the diffractive element 32.

In use some of the light from the laser 26 passes through the pattern of the diffractive element 32 and some is reflected by the lines making up the pattern. The light passing through reflects from the rear surface of the membrane 24 and back through the diffractive element 32. The relative phase of the light that has travelled these two paths determines the fraction of light which is directed into the different diffraction orders of the diffractive element (each diffraction order being directed in fixed direction). In presently preferred embodiments the diffractive element 32 is in the form of a diffractive Fresnel lens. Thus the lines of the diffractive pattern 32 are sized and spaced according to the standard Fresnel formula which gives a central focal area corresponding to the zeroth order. The first photo-detector 28 is positioned to receive the light in the zeroth order, while the second photo-detector is positioned to receive light from the focused first diffraction order of the diffractive Fresnel lens. When the spacing between the diffractive element 32 and the membrane 24 is half of the wavelength of the laser light from the diode 26 or an integer multiple thereof, virtually all light reflected by the diffractive element is directed into the zeroth diffraction order. At this position the second detector 30 receives very little light as it is located at the position of the diffractive element's first order (which is focussed into a point for a diffractive Fresnel lens).

Figure 4:
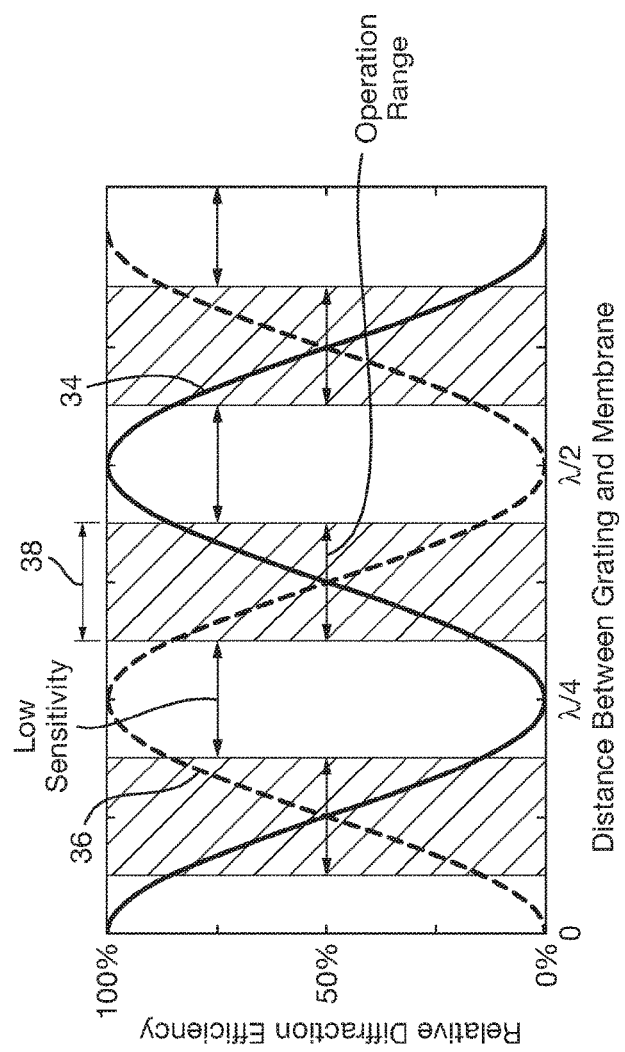
FIG. 4 is a graph showing light intensity at each of the two detectors against membrane displacement for the microphone of FIG. 3.

As will be appreciated, the optical path length is of course dependent on the distance between the diffractive element 32 and the membrane 24. The intensity of light recorded by the first photo-detector 28 measuring the zeroth diffraction order and the second photo-detector 30 (whose positions are fixed), varies as the above-mentioned spacing varies but in an out-of-phase manner. This is illustrated by the graph in FIG. 4. One line 34 corresponds to the intensity recorded at the first photo-detector 28 and the other line 36 corresponds to the intensity recorded at the second photo-detector 30. As mentioned above, when the spacing is equal to half of the wavelength (or an integer multiple thereof) the intensity 34 at the first detector 28 is at a maximum and drops off to zero as the spacing changes to a quarter wavelength or odd multiples thereof. The intensity 36 recorded at the second detector 30 is a quarter wavelength out of phase with this and so the second line 34 is at a maximum when the first line is at a minimum and vice versa.

The sensitivity of the microphone is determined by the change in output signal for a given change in displacement of the membrane. It can be seen from FIG. 4 therefore that the maximum sensitivity occurs in the zones 38 in which the lines 34, 36 have maximum gradient. This is also the zone in which the gradient is approximately linear.

Although it may be possible to carry out the necessary measurement with only one photo-detector, the two detectors 28, 30, measuring the zeroth and first diffraction orders respectively, may be advantageous as taking the difference between those two signals could provide a measurement that is corrected for fluctuations in laser intensity.

Figure 5:
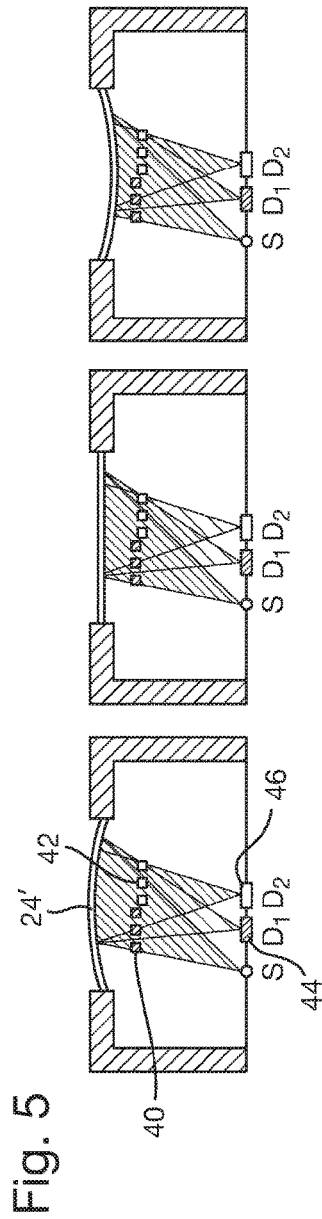
FIG. 5 is similar to FIG. 3 but with a variant of the design of optical microphone.
Figure 6:
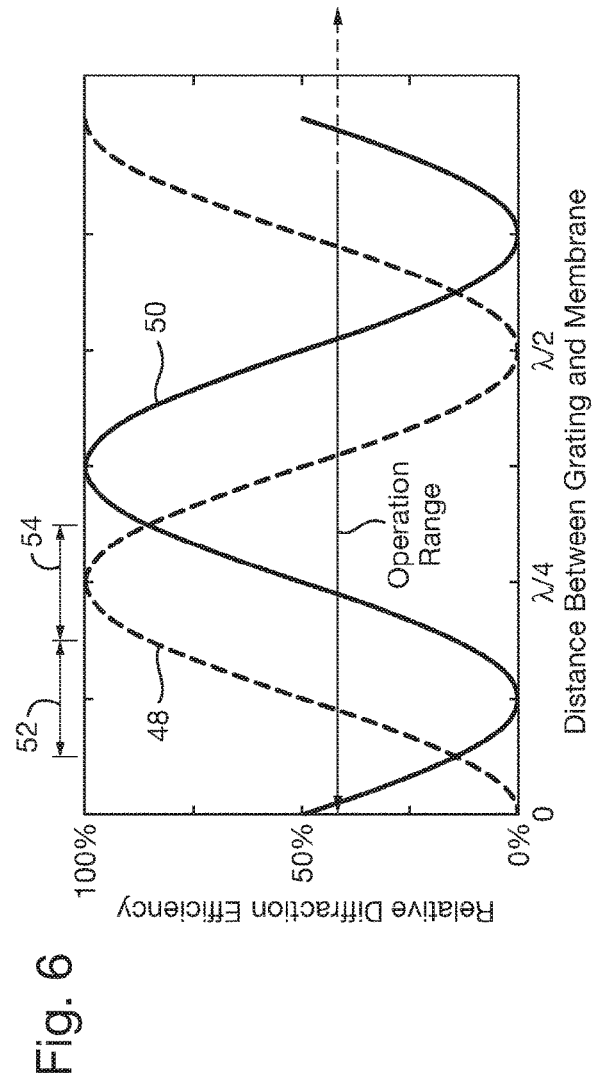
FIG. 6 is a graph of intensity vs displacement for the detectors of FIG. 5.

A variant of the arrangement described above is shown in FIGS. 5 and 6. In this arrangement there are two separate diffractive elements 40, 42, with a relative offset in distance relative to the microphone membrane 24' (in this case an offset of one eighth of the wavelength of the laser). With one photo-detector 44 positioned in alignment with a particular diffraction order of the first diffractive element 40 and a second photo-detector 46 aligned with an order of the second diffractive element 42, the lines 48, 50 respectively of FIG. 6 are achieved. From these it can be seen that the signals detected by the two detectors 44,46 are one eighth of a wavelength out of phase with one another, the maximum sensitivity zones 52, 54 of the two respective diffractive elements are contiguous and so by using the signals from both detectors 44, 46 the dynamic range of the microphone can be extended.

It is possible of course to use three or more diffractive elements with predetermined offsets relative to the membrane, in order to produce three or more signals with predetermined phase offsets. Those signals can then be recombined in order to provide a measurement of the membrane displacement with high linearity, on a large dynamic range and compensated for fluctuations in laser intensity.

Figure 7:
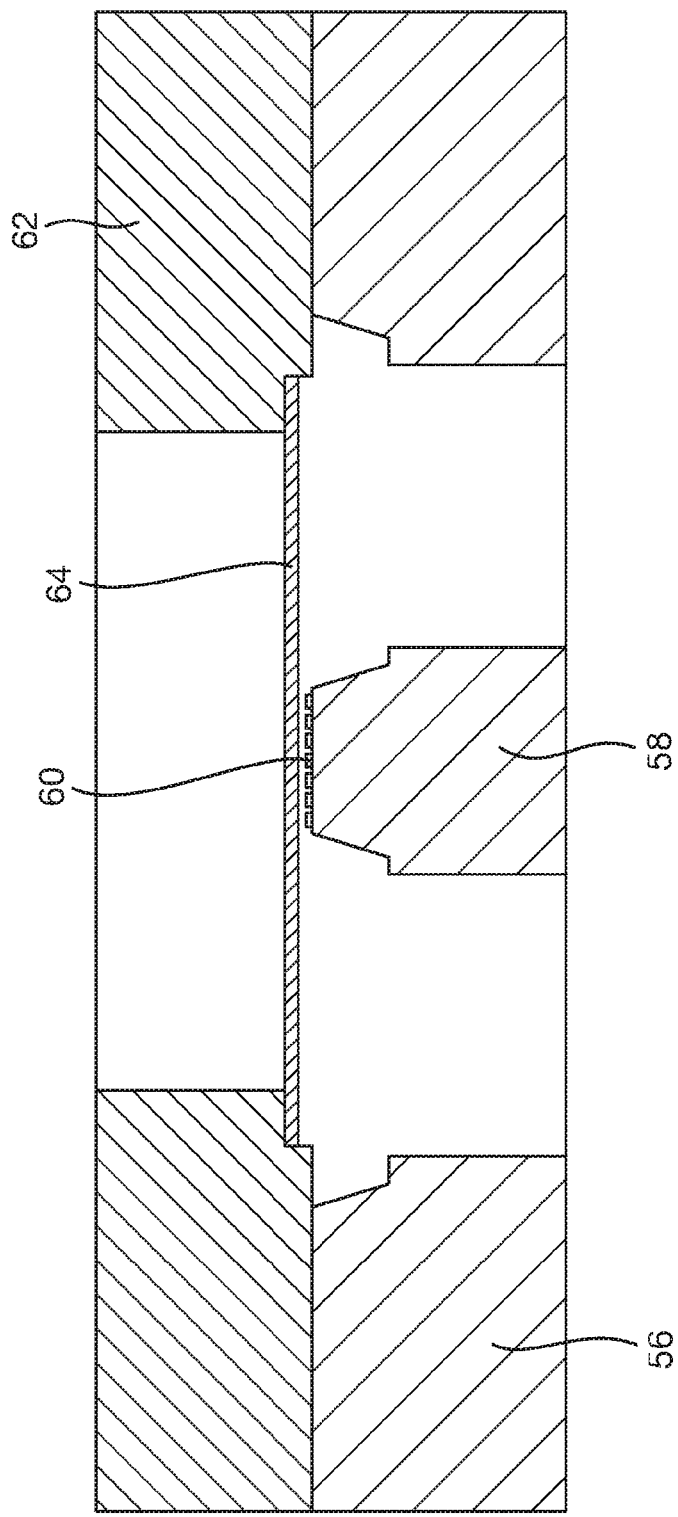
FIG. 7 is a more detailed sectional view of a possible optical microphone layout.

FIG. 7 shows certain an exemplary optical microphone in a little more detail. This comprises a transparent glass substrate 56 which includes a central portion 58 on which is provided the diffractive element 60 formed as a number of reflective lines. A silicon layer 62 is provided on top of the glass substrate 56 and the silicon nitride membrane 64 is provided between them. The glass substrate 56 has been structured in order to allow air to be displaced from under the membrane 64 when the latter moves under the action of incident sound waves.

As previously mentioned the 'oversampled' array of optical microphones described herein can be used to analyse received sound on a number of different assumptions. As will be described below these could correspond to differing directions of emanation or environmental conditions. These candidates can then each be used to attempt speech recognition with the most successful one being adopted.

First the use of an array of microphones to focus on sound from a particular direction will be explained. This is known as beam forming and can be considered to be equivalent to the problem of maximizing the energy received from a particular direction (taken in this example to be the 'forward' direction, normal to the array) whilst minimizing energy from other directions.

Minimizing the narrowband energy coming into an antenna array (in a half-plane) through a beam former, subject to the constraint of fixing energy (and avoiding distortions) in the forward-looking direction, amounts to:

$$\min_w \int_0^\pi |w^H a(\theta)|^2 d\theta \text{ subject to } w^H 1 = \text{constant} \quad \text{Equation (1)}$$

Where $a(\theta)$ is a steering vector at the angle $\theta$, and $w \in \mathbb{C}^P$ w is the antenna weight vector, which is complex and hence can encompass both time-delays and weighting (the present analysis is carried out in the frequency domain). P is the number of array elements. The purpose of the weights is to work on the incoming signals to get an aggregate signal. Let y denote the Fourier-transformed signal vector coming from the array. Then the aggregate signal, or the output from the beam former becomes $z = w^H y$ The objective is to design the weights vector w such that the aggregate signal z has certain characteristics. In array processing, these are typically related to spatial behavior, i.e. how much the aggregate signal z is influenced by signals coming from some direction versus other directions. This will now be explained in more detail. Equation (1) can be discretized as:

$$\min_w \sum_{i=1}^N |w^H a(\theta_i)|^2 \text{ subject to } w^H 1 = \text{constant} \quad \text{Equation (2)}$$

For some discretization of angles $\theta_1, \theta_2, \ldots, \theta_N$. The sum can be rewritten as:

$$\sum_{i=1}^N |w^H a(\theta_i)|^2 = \sum_{i=1}^N w^H a(\theta_i)^H w = \quad \text{Equation (3)}$$

$$w^H \left\{ \sum_{i=1}^N a(\theta_i) a(\theta_i)^H \right\} w = w^H C w$$

$$\text{where } C = \left\{ \sum_{i=1}^N a(\theta_i) a \right\}$$

So the discretized optimization criterion becomes:

$$\min_w w^H C w \text{ subject to } w^H 1 = \text{constant} \quad \text{Equation (4)}$$

This is a modified or constrained eigenvector problem, that could be solved using a number of well-known techniques. One such variant will be described. It should be note that, in general, the vector 1 is equal to one of the steering vectors, the one where $\theta = \lambda/2$. The problem could therefore be reformulate as one having a least squares focus, which is to try to fit the beam pattern so that there is full focus forwards and as low energy as possible in all other directions. This could be accomplished as:

$$\min_w \sum_{i=1, i \neq k}^N \alpha_i \|w^H a(\theta_i) - 0\|_2^2 + \alpha_k \|w^H a(\theta_k) - 1\|_2^2 \quad \text{Equation (5)}$$

Where k is the index of the forward looking steering vector, i.e. a $(\theta_k) = 1$. This expression states that using weights is an attempt to force every angular response to zero, except the forward looking one, which is being attempted to be forced to unity. It is generally presumed that there is no preference as to which directions (other than the forward looking one) are more important to force down, so it can be assumed that $\alpha_i = \alpha_j = c$ for i, j ≠ k. Note that this can now be rewritten as:

$$\min_w c \cdot w^H \tilde{C} w + \alpha_k \|w^H 1 - 1\|_2^2 \Leftrightarrow \quad \text{Equation (6)}$$

$$\min_w w^H \tilde{C} w + \frac{\alpha_k}{c} \|w^H 1 - 1\|_2^2$$

Where $\tilde{C}$ is the matrix generated the same way as C, but with the k'th steering vector kept out i.e:

$$\tilde{C} = \left\{ \sum_{i=1, i \neq k}^N a(\theta_i) a(\theta_i)^H \right\} \quad \text{Equation (7)}$$

It should be noted that for the original optimization problem in Equation (4), it makes no difference whether one tries to minimize $w^H \tilde{C} w$ or $w^H C w$—the relationship between the forward-looking vector 1 and the weights w (i.e. the constraint) makes sure of this.

It will be noted also that the right hand side of Equation (4) is the Lagrange multiplier expression for solving the modified eigenvalue problem (when the constant=1). So Equations (4) and (6) are equivalent, and so also Equations (4), (5) and (6) are equivalent under the foregoing assumptions. So, starting to work on equation (5), it may be seen that it can be rewritten as:

$$\min_w \sum_{i=1}^{N} \alpha_i \|w^H a(\theta_i) - e_i\|_2^2 \qquad \text{Equation (8)}$$

Where $e_i=0$ for all i but k, where $e_k=1$.
By defining $a_i=a(\theta_i)$ there is now:

$$\sum_{i=1}^{N} \alpha_i \|w^H a_i - e_i\|_2^2 = \sum_{i=1}^{N} \|w^H (\alpha_i a_i) - \alpha_i e_i\|_2^2 = \qquad \text{Equation (9)}$$

$$\sum_{i=1}^{N} \|w^H \tilde{a}_i - \tilde{e}_i\|_2^2$$

This simply implies seeking the least squares solution to the problem:

$$\min_w \|w^H \tilde{A} - \tilde{e}\|_F^2 \qquad \text{Equation (10)}$$

where $\tilde{A}=[\alpha_1 a_1, \alpha_2 a_2, \ldots, \alpha_N a_N]$ and $\tilde{e}=[\alpha_1 e_1, \alpha_2 e_2, \ldots, \alpha_N e_N]=[0, 0, \ldots, \alpha_k, 0, 0, \ldots]$.

This is effectively saying that it is necessary to try to find a complex vector (w) whose elements combine the rows of the matrix $\tilde{A}$ so that they become a scaled, unit row vector, where only the k'th element is different from zero. But more generally, in trying to separate the different spatial directions, one could choose multiple vectors $\{w_i\}$ each focusing in on a different spatial direction. Having solved this problem, it will be the case that Equation (10) above will also have been solved. This would be to try to find a matrix W such that:

$$\tilde{W}^H \tilde{A} = \alpha_k \cdot I \text{ where } W=[w_1, w_2, \ldots w_N] \qquad \text{Equation (11)}$$

However this simply amounts to saying that the matrix $\tilde{A}$ has a (pseudo)-inverse. Moreover, it should be notes that if $\tilde{A}$ has a pseudo-inverse, then A also has a pseudo-inverse. This follows since the columns of the matrix $\tilde{A}$ are simply rescaled versions of the columns of A. It is therefore possible, quite generally, to focus on whether or not A has a pseudo-inverse, and under which circumstances.

In array processing, the steering vectors of a uniform, linear array (ULA) become sampled, complex sinusoids. This means that the column vectors of A are simply complex sinusoids. If more and more elements are added within the base-line of the array (i.e. the array is oversampled), the sampling quality (or resolution) of those sinusoids is gradually improved.

When, hypothetically, the number of rows tends to infinity, then the columns of the matrix A will be samplings of continuous complex sinusoids. Any (non-continuous) level of resolution can be seen as a quantization of the continuous complex sinusoids.

Let $\omega_1, \omega_2, \ldots \omega_Q$ be a set of frequencies, with $\omega_i \neq \omega_j$ for all $i \neq j$.

Let R be the support length. Let $$f_k(t) = e^{i\pi t \bar{\omega}_k}$$

$t \in [0, R]$, and $f_k(t)=0$ elsewhere.
Then the functions $f_k(t)$ are linearly independent.

What this implies is that in the theoretically idealized case where there are an infinite number of array antenna elements, infinitely closely spaced, the sinusoids corresponding to the spatial directions (i.e. the steering vectors) would all be unique, and identifiable, and no one sinusoid could be constructed as a linear combination of others. This is what yields the "invertibility" of the (row-continuous) matrix A. However, in practice, there is a finite number of elements, which results in a discretization of this perfect situation. While the continuous sinusoids are all unique and linearly independent of one another, there is no guarantee that a discretization of the same sinusoids obey the same properties. In fact, if the number of antenna elements is lower than the number of angles which the device is trying to separate spatially, it is guaranteed that the sinusoids are not independent from one another. It follows, however, that as the number of rows in the matrix A increases—i.e. the number of antenna elements in the array increases—the matrix A becomes "more and more invertible" because it approaches closer and closer to the perfect (continuous) situation. As more antenna elements are inserted, the dimensions of the matrix C increases, as do the number of rows in the matrix A, from which the matrix C is derived. As explained above, the more "invertible" the matrix A, the easier it become to satisfy the conditions in equation (2) above, i.e. $\min_w w^H C w$ subject to $w^H 1$=constant.

It is easy to see how the above considerations become important for the optimal implementation of the invention, and in particular to the real-life challenges arising. The processor carrying out the algorithms in accordance with the invention is effectively working with eigenvectors of matrices and is concerned with small eigenvectors/eigenvalue pairs, i.e. those that will minimize or closely minimize $$s(w|C) = \min_w w^H C w \qquad \text{Equation (12)}.$$

This means that there are specific precautions that must be taken. Ignoring for the moment ignore the constraint "$w^H 1$=constant" (since this can be shown to be a minor modification giving a projection onto a subspace), and recapturing how the eigenvalues and eigenvectors behave, the eigenvalue decomposition of the matrix C (which is Hermitian) can be considered:

$$C = \sum_{i=1}^{r=rank(C)} \lambda_i v_i v_i^H \qquad \text{Equation (13)}$$

Where $\{\lambda_i\}$ is the set of non-zeros eigenvalues, sorted by decreasing values. The following term is considered:

$$w^H C w = w^H \left[ \sum_{i=1}^{r=rank(C)} \lambda_i v_i v_i^H \right] w = \qquad \text{Equation (14)}$$

$$\sum_{i=1}^{r} \lambda_i w^H v_i v_i^H w = \sum_{i=1}^{r} \lambda_i (w^H v_i)^2$$

It can be seen that when w is more parallel to the eigenvectors corresponding to small eigenvalues, the term gets smaller. It is also known that eigenvectors corresponding to small eigenvalues are generally unstable. This means that a small change to the matrix C could give very different scores, for instance that $s(w|C) \ll s(w|\tilde{C})$ For some perturbation $\tilde{C}$ of the matrix C. This means that, if there was a small error on C, the effective array resolution (which is related to s) could be dramatically degraded.

However this is exactly what will happen in many real life scenarios. Consider the matrix C specifically, which is constructed as:

$$C = \left\{ \sum_{i=1}^{N} a(\theta_i) a(\theta_i)^H \right\}$$ Equation (15)

The steering vectors $a(\theta)$ are related to, among other things, the speed of sound. However in practice the speed of sound will change relative to its assumed value a result of temperature or humidity changes. For example a change from an assumed value of 340 m/to an actual value of 345 m/s would give rise to a distortion of C (to become $\tilde{C}$)) which could be have an order of magnitude impact on the score s.

For the purpose of speech recognition therefore, it might be necessary to apply several versions of the matrix C and the associated (optimal) weights w, to get the desired resolution. This could happen in a number of ways including: trying out different combinations C/w relating to different temperatures, and seeing which array output has the lowest overall energy; trying out different combinations C/w relating to different temperatures, and seeing which array output has the signal output which is most representative of speech (say, reflecting the statistical distribution of a speech signal); and trying out different combinations C/w relating to different temperatures, and seeing which array gives the highest classification rates with a speech recognition engine.

Referring back to FIG. 2, it may be seen that, although the first processor 14 may be sufficiently powerful to carry out some of these steps, the demands on this processor will quickly become high and hence drive either the cost of the circuitry, and/or the power consumption up to a level which is too high for a mobile device. However by using the remote processor 16 to conduct this more extensive search whenever it is needed, power can be saved by keeping the remote processor can in a low power mode when such operations are not necessary. It will be appreciated of course that this advantage can be achieved even if both processors are provided on the same device. It is therefore not essential for one of the processors to be provided remotely.

Figure 8:
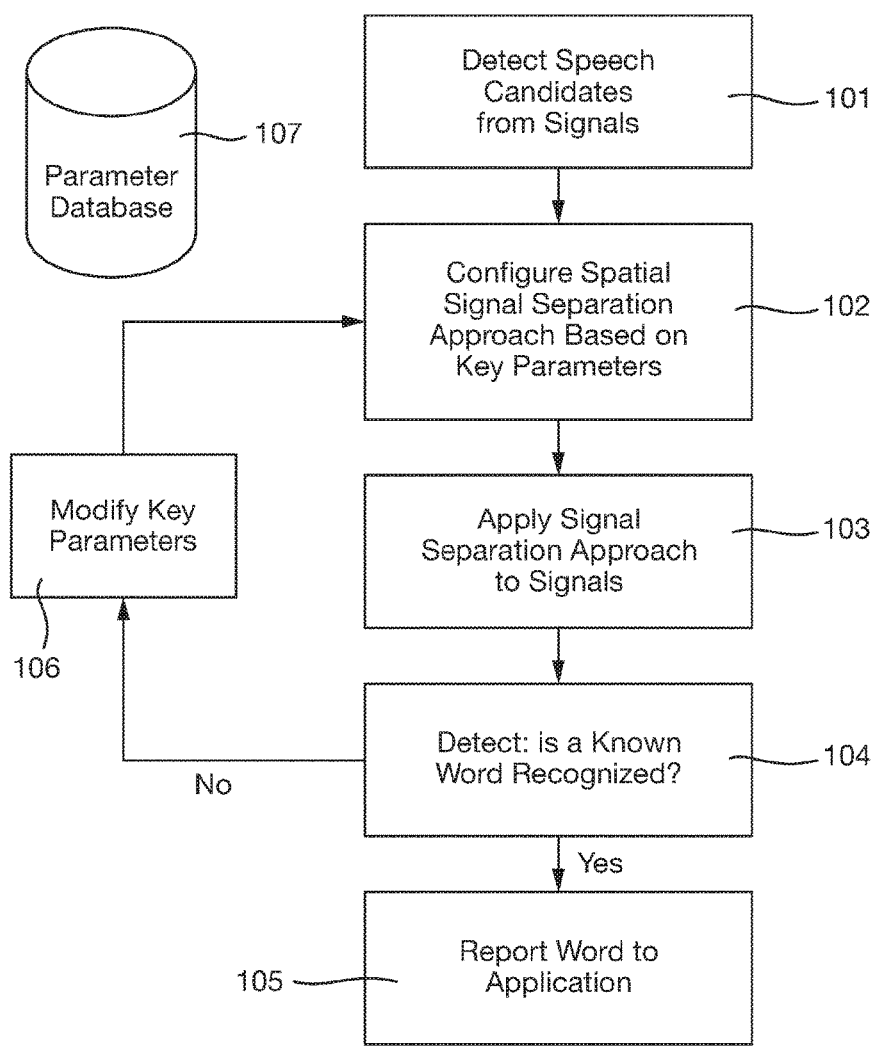
FIG. 8 is a flow chart describing the candidate selection process which may be employed in accordance with the invention.

A more specific example of the use of greater processing power to select from multiple candidates will now described with reference to FIG. 8. In the first step 101 a candidate for a speech signal is detected from one or more microphones 2, as previously described. The detection could be carried out by the first processor 12.

Next, in step 102, the signal separation algorithm is "set up", meaning that it is based on certain assumptions about the physical conditions and realities around the microphone array. For instance, the steering vectors $a(\theta)$ have a relation to the speed of sound, and so an assumption as to what the speed of sound is—it could be 340, 330 or 345 m/s depending on things like temperature or humidity—would be a parameter that could be "set". Next, in step 103, those parameters are applied with a signal separation algorithm. It would often be a beam former, but it could also be a time-domain de-convolution approach or any other approach. The output, or potentially the plurality of outputs, from this process is/are then fed to a speech recognition engine at step 104.

If the speech recognition engine recognizes a word from a dictionary or a vocabulary, that word, or some other indication of that word such as its short form, hash code or index, can be fed to an application at step 105. It should be noted that although the term "word" is used herein, this could be replaced with a phrase, a sound, or some other entity that is of importance for natural speech recognition.

If no word is recognized at step 104, or if the likelihood of correct classification is too low, or some other key criterion is met such as the determined risk of dual or multiple word matches being deemed too high, the process moves on to step 106, where they key parameters are modified. As mentioned before, those could be relating to key physical variables like the speed of sound and the impacting result on the steering vectors (and in turn, the matrix C) However, they could also relate to different beam patterns or focusing strategies. For instance, in one instance of the parametric selection, a relatively broad beam may be used, and in another, a narrower beam used. They could also relate to different algorithm selections. For instance, if at first, beam formers were used without luck, more computationally complex searches like time-domain de-convolution approaches could be attempted.

The legal set of "parameters" for this search may be contained in a parameter database 107. This could be implemented either as a list, matrix or other structure of legal and relevant parameters to use for the search, and could include without being limited to: speed of sound, background noise characteristics, assumptions of positions of potential interfering sources, assumptions of sensor overload (saturation), or any other, searchable quantity. Likewise, the database 107 need not be a fixed database with a final set of parameters setting; it could equally well be a "generator algorithm" that constructs new parameters sets using a set of rules to search for words using a variety of said settings.

Even though the implementation here is shown as "sequential", parallel implementation can be equally well envisaged, where various levels of confidence in the detection process of words are matched against each other and the "winner" selected. Depending on the CPU architecture, such an approach may sometimes be much faster and efficient.

Impact of Noise

Consideration is now given to the impact of noise in real-world implementations. For this the algorithm seeks to use the weights vector w to "lock" energy/focus in the forwards direction. At the same time there should ideally be as little energy as possible coming in through the beam former from other directions, whether it is interference (from other directions) or noise. This is illustrated in FIG. 8 where it is desirable to lock onto and receive the main beam whilst suppressing the side lobes.

A suitable discretization yields the following equation:

$$y = \int_0^\pi a(\theta)s(\theta) + n = \sum_{i=1}^{N} a(\theta_i)s(\theta_i)n$$ Equation (16)

In fact, this is an approximation, but the associated error cold be modeled into the noise term n, so this can be accepted for now. Here, the numbers $s(\theta_i)$ are the signals arriving from the different directions $\theta_i$. Those are complex numbers representing phase and amplitude, since it is the frequency domain being considered. Carrying this out on vector/matrix form, gives:

$$y = \sum_{i=1}^{N} a(\theta_i)s(\theta_i) + n = As + n \text{ where}$$

$$A = [a(\theta_1)a(\theta_2) \ldots a(\theta_N)] = [a_1 a_2 \ldots a_N]$$

$$s = \begin{bmatrix} s(\theta_1) \\ s(\theta_2) \\ \vdots \\ s(\theta_N) \end{bmatrix} = \begin{bmatrix} s_1 \\ s_2 \\ \vdots \\ s_N \end{bmatrix} \text{ and } n = \begin{bmatrix} n_1 \\ n_2 \\ \vdots \\ n_N \end{bmatrix}$$

Equation (17)

Where $n_i$ is the (complex) noise at each sensor. To bring into focus the forward looking "lock", this can be rewritten as:

$$y = As + n = \tilde{A}\tilde{s} + a_k s_k + \tilde{n}$$

Equation (18)

Where k is the index of the forward looking vector ($\theta = \pi/2$), which means that $a_k = 1$, A beam forming weights vector w is now applied to obtain a beam formed signal $$z = w^H y = w^H [As+n] = w^H [\tilde{A}\tilde{s} + a_k s_k + \tilde{n}] = w^H [\tilde{A}\tilde{s} \pm 1 s_k + \tilde{n}] = w^H \tilde{A}\tilde{s} + w^H 1 s_k + w^H \tilde{n}$$

Equation (19)

It is already known that $w^H 1 = 1$ (because w was derived under this condition) so the expression is now:

$$z = w^H \tilde{A}\tilde{s} + s_k + w^H \tilde{n}$$

Equation (20)

What is of interest is the signal $s_k$ which is the signal coming from the forwards directions. In trying to recover this signal as well as possible (through beam forming), the other two terms, $w^H \tilde{A}\tilde{s}$ and $w^H \tilde{n}$ should be as small as possible in terms of magnitude. Since z already 'captures' the signal $s_k$ (and must do so due to the design of w), effectively one wishes to minimize the expectation of |z|. This amounts to wanting to minimize $$E|z|^2 = E\{zz^*\}$$

$$= E\{(w^H \tilde{A}\tilde{s} + s_k + w^H \tilde{n})(w^H \tilde{A}\tilde{s} + s_k + w^H \tilde{n})^*\}$$

$$= E(w^H \tilde{A}\tilde{s})(w^H \tilde{A}\tilde{s})^* + |s_k|^2 + E(w^H \tilde{n})(w^H \tilde{n})^*$$

$$= E(w^H \tilde{A}\tilde{s}\tilde{s}^H \tilde{A}^H w) + |s_k|^2 + E(w^H \tilde{n}\tilde{n}^H w)$$

$$= w^H E(\tilde{A}\tilde{s}\tilde{s}^H \tilde{A}^H)w + |s_k|^2 + w^H E(\tilde{n}\tilde{n}^H)w$$

$$= w^H \tilde{A}\tilde{A}^H w + |s_k|^2 + \sigma^2 w^H I w$$

$$= w^H \tilde{A}\tilde{A}^H w + |s_k|^2 + \sigma^2 w^H w$$

$$= w^H \tilde{A}\tilde{A}^H w + |s_k|^2 + \sigma^2 \|w\|_2^2$$

$$= w^H \tilde{C} w + |s_k|^2 + \sigma^2 \|w\|_2^2$$

Equations (21)

Where it has been assumed the sources (s) are uncorrelated and of equal (unit) energy, although other energy levels make no difference to the following arguments. Now, the first term may already be recognized as the one minimized originally, so this is, in a certain sense, already "minimal" for the w chosen. The second term is fixed and the third term has two components, the noise variance and the norm of the vector w. The signal-to-noise-and-interference ratio can be described as:

$$SINR = \frac{|s_k|^2}{w_H \tilde{C} w + \sigma^2 \|w\|_2^2} = |s_k|^2 \cdot \frac{1}{w_H \tilde{C} w + \sigma^2 \|w\|_2^2}$$

Equation (22)

Where only the last term needs to be observes since the signal energy is going to be a (situation dependent) constant. Clearly, the variance of the noise is important and so the low noise level of the optical microphones is particularly desirable to obtaining a good SINR in the beam forming context.

Figure 9:
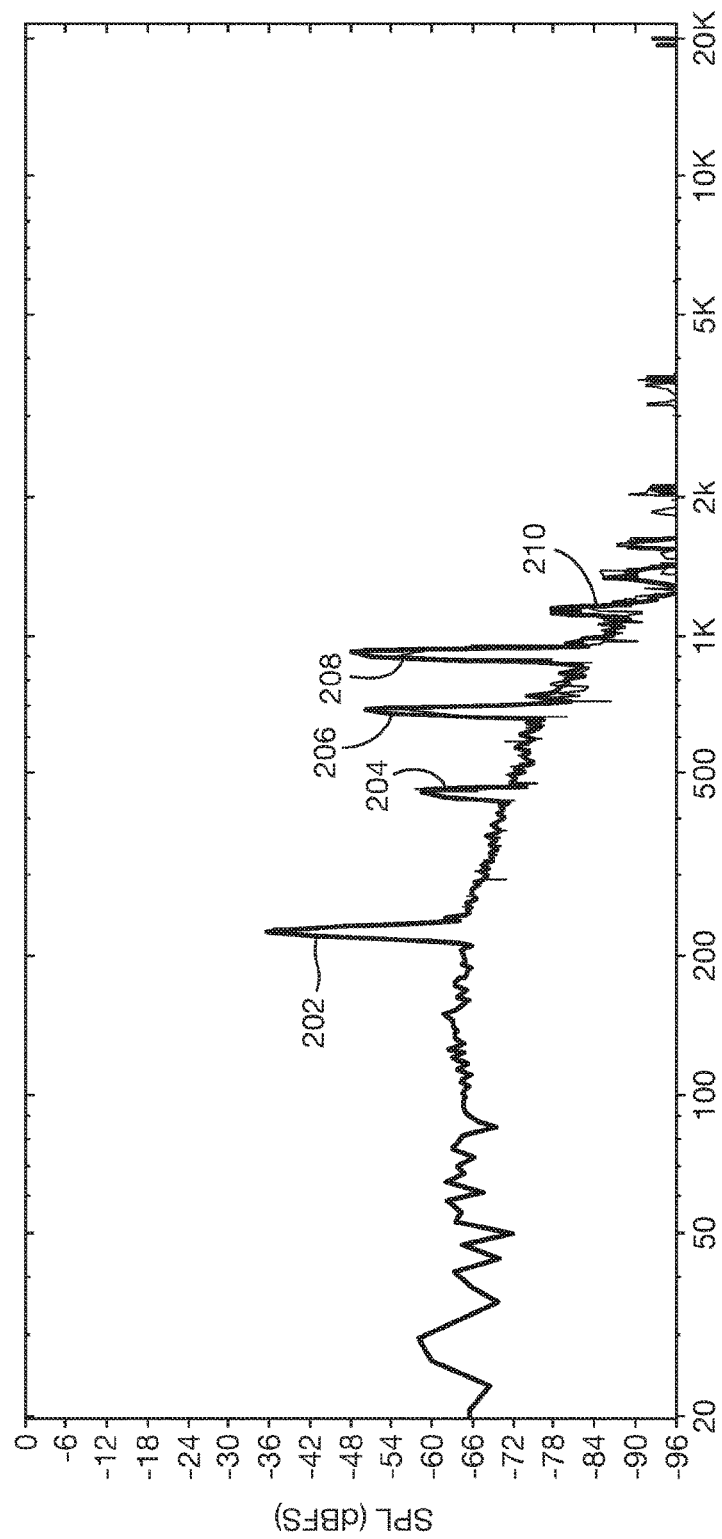
FIG. 9 is a graph showing the received frequency spectrum for a spoken 'a' sound.

FIG. 9 shows a Fast Fourier Transform plot of a typical audio signal received when a person utters the letter sound 'a'. From this it may be seen that the spectrum has a main peak 202 at a base frequency of 226 kHz. However there are additional clear overtones 204, 206, 208, 210 at twice, four times, eight times and sixteen times the frequency. These can be used to further boost performance of speech recognition as will be described below with reference to FIG. 10. Although the specific examples given here are power-of-two multiples of the base frequency, this is not essential; the invention can be used with any convenient integer multiples of the base frequency.

FIG. 10 is a flowchart describing operation of a further embodiment of the invention which employs the overtones 204-210 illustrated in FIG. 9. This is a modified version of the operation described above with reference to FIG. 8.

As before, in the first step 1010 a candidate for a speech signal is detected from one or more microphones 2 and in step 1020, the signal separation algorithm is "set up", meaning that it is based on certain assumptions about the physical conditions and realities around the microphone array such as the speed of sound etc.

Next, in steps 1030, those parameters are applied with signal separation algorithms to signals at the base frequency and also in parallel steps 1031, 1032 at the first to nth overtone frequencies. The separation can be made individually, based on individual parameters for each of the frequencies of interest. However, the separation can also share one or more parameters, such as those relating to a series of guesses of spatial directions, which will typically co-occur for any given audio source outputting multiple frequencies (i.e. overtones). Other parameters, such as guesses on amplitude of the signal components (which could be based on predictive approaches) could also be shared.

In step 1040, the outputs of the overtone signal separations are combined. This could happen in any number of ways. For instance, the separated overtone signals could be added up before passed onto step 1050. In other embodiments, the amplitudes or envelopes of the signals could be added. In yet other embodiments, the signals or their envelopes/amplitudes could be subject to separate filters before being joined—so that, for instance, any component too contaminated by noise or interference is not made part of the sum. This could happen using e.g. an outlier detection mechanism, where for instance the envelope of the frequency components are used. Frequencies with an envelope pattern diverging significantly from the other envelope patterns may be kept out of the calculations/combinations.

Even though the frequencies are treated distinctively separate in steps 1030, 1031, . . . 1032 and then recombined at step 1040, the treatment of overtones may not need to be divided up explicitly. For instance other embodiments could use time-domain techniques which don't employ Fourier transformations and hence individual frequency use per se, but instead use pure time-domain representations and then effectively tie information about overtones into the estimation approach by using appropriate covariance matrices, which essentially build in the expected effect of co-varying base-tones and overtones into a signal estimation approach.

As before a speech recognition engine is used to see whether it recognizes a word from a dictionary or a vocabulary at step 1050. If so, that word, or some other indication of that word such as its short form, hash code or index, can be fed to an application at step 1060. It should be noted that although the term "word" is used herein, this could be replaced with a phrase, a sound, or some other entity that is of importance for natural speech recognition.

If no word is recognized at step 1050, or if the likelihood of correct classification is too low, or some other key criterion is met such as the determined risk of dual or multiple word matches being deemed too high, the process moves on to step 1070, where they key parameters are modified.

Again, as before, the legal set of "parameters" for this search may be contained in a parameter database 1080.

The invention claimed is:

1. An optical microphone arrangement comprising:
   an array of optical microphones on a substrate, wherein the optical microphones are arranged at a mutual spacing of less than 5 mm, each of said optical microphones providing a signal indicative of displacement of a respective membrane as a result of an incoming audible sound;
   a first processor arranged to receive said signals from said optical microphones and to perform a first processing step on said signals to produce a first output; and
   a second processor arranged to receive at least one of said signals or said first output;
   wherein the first processor is arranged to determine presence of at least one element of human speech from said audible sound and, in response to determining that said element of human speech is present, to issue a wake-up signal to the second processor;
   wherein the second processor is arranged to receive the wake-up signal and, in response to receiving the wake-up signal, to change from a relatively passive mode to a more active mode; and
   wherein at least said second processor determines presence of at least one element of human speech from said audible sound.

2. The optical microphone arrangement as claimed in claim 1 wherein at least one of the first and second processors is arranged to perform a plurality of processing operations on said signals wherein said processing operations correspond to a plurality of assumptions that the signals emanate from a respective plurality of directions to give a plurality of candidate determinations; and thereafter to select one of said candidate assumptions based on a selection criterion.

3. The optical microphone arrangement as claimed in claim 1 wherein the first processor and the optical microphone array are provided in a common device.

4. The optical microphone arrangement as claimed in claim 1 wherein the second processor is provided remotely of a device in which the optical microphone array is provided.

5. The optical microphone arrangement as claimed in claim 1 wherein the first processor is arranged to carry out initial signal processing to assist with speech recognition in the second processor.

6. The optical microphone arrangement as claimed in claim 1 wherein said first processor is arranged to carry out beamforming on said signals and said second processor is arranged to carry out speech recognition.

7. The optical microphone arrangement as claimed in claim 1 wherein the second processor is arranged to determine presence of at least one element of human speech from said audible sound using at least a base frequency and an overtone frequency which is an integer multiple of said base frequency.

8. The optical microphone arrangement as claimed in claim 7 arranged to use a plurality of overtones.

9. The optical microphone arrangement as claimed in claim 7 wherein the optical microphones also have a mutual spacing less than half of a wavelength of said base frequency.

10. The optical microphone arrangement as claimed in claim 7 arranged to carry out beamforming at a frequency of the overtone(s).

11. The optical microphone arrangement as claimed in claim 10 wherein said beamforming is carried out by the first processor.

12. The optical microphone arrangement as claimed in claim 1 wherein the optical microphones comprise: a membrane; a light source arranged to direct light at said membrane such that at least a proportion of said light is reflected from the membrane; and an optical detector arranged to detect said reflected light.

13. The optical microphone arrangement as claimed in claim 12 comprising a diffractive element is provided between said light source and said membrane.

14. The optical microphone arrangement as claimed in claim 13 wherein the diffractive element comprises a diffractive pattern formed by a reflective material.

15. The optical microphone arrangement as claimed in claim 12 comprising a plurality of detectors for each microphone.

16. The optical microphone arrangement as claimed in claim 12 comprising a plurality of diffractive elements for each microphone.

17. A method of determining presence of at least one element of speech from an incoming audible sound, said audible sound having at least a portion thereof within a wavelength band, the method comprising receiving said audible sound using the optical microphone arrangement of claim 1, wherein the mutual spacing is also less than half of a shortest wavelength of said wavelength band; and processing the signals from the microphones to detect said element of speech.

18. The method as claimed in claim 17 comprising processing the signals from the microphones so as to use preferentially a portion of said audible sound received from a given direction or range of directions.

19. The method as claimed in claim 18 comprising using sound from a plurality of directions and selecting one of said directions based on which gives a best result.

* * * * *